United States Patent Office 2,865,974
Patented Dec. 23, 1958

2,865,974

NEGATIVE PLATES AND THE PRODUCTION THEREOF

Robert F. Scheuerle, Philadelphia, and John B. Metzinger, Oreland, Pa., assignors to The Electric Storage Battery Company, a corporation of New Jersey No Drawing. Application April 28, 1955
Serial No. 504,674

4 Claims. (Cl. 136—30)

The invention relates to negative plates of the type used in silver-zinc batteries containing an alkaline electrolyte and to methods of producing such plates which in an intermediate stage of their production comprise mainly zinc oxide and, when charged, comprise highly reactive metallic sponge zinc.

Heretofore negative plates for these batteries have been generally prepared by mixing zinc oxide powder with water to form a paste and then applying the paste to a supporting grid member generally consisting of a silver, copper or bronze screen. The supporting member has also occasionally been formed of metallic zinc but in this case, due to the relatively low conductivity of that metal, an additional conducting member such as for example a silver wire was required to produce the high rate discharges and excellent capacities of which this type of electro-chemical couple is capable.

The prime disadvantage of these plates has been found to be in the mechanical weakness thereof. Although in numerous instances giving excellent electrical performance, the plates, composed of zinc or zinc oxide particles having only a weak mechanical adherence to each other and to the supporting member, have been relatively difficult to handle during manufacturing operations due to their relative fragility. Nor has this basic defect been overcome by the attempted use of various types of binders, such as latex, resins of the thermoplastic or the thermosetting type, or the like. Additionally, the use of water pastes involving sloppage and drying operations is not susceptible of optimum manufacturing techniques.

In U. S. patent application, Serial No. 480,621, filed January 7, 1955, as a continuation-in-part of Serial No. 390,709, now abandoned, and assigned to the assignee of the present application, there has been disclosed and claimed a method of producing zinc negative plates by mixing powdered zinc oxide with an aqueous potassium hydroxide solution of above about 5% strength and pasting said mixture onto a grid. Although providing a negative plate which is more mechanically stable than those known to the prior art, the process of the above referred to application retains some of the prior art disadvantages from the manufacturing standpoint.

It has been found that the advantages of the process discussed and claimed in the above referred to patent application can be retained and the disadvantages from the manufacturing standpoint completely eliminated by the process which is to be hereinafter described and claimed, and that a negative plate differing in kind from those known to the prior art will be produced.

The process of the present invention consists in preparing a so-called dry mix. In practice it consists basically in mixing zinc oxide powder with substantially dry potassium hydroxide powder, the latter being present in an amount of from about 0.5% to about 5% by weight of the total mixture. Although potassium hydroxide is preferred, it is also within the contemplation of the invention that other alkaline hydroxides such as sodium hydroxide and lithium hydroxide can be utilized.

The mixture is stored for a period of time during which the dry potassium hydroxide, being hygroscopic, will absorb moisture from the atmosphere.

Although the period of time will, of course, vary with the humidity content of the atmosphere, it has been found that in a preferred mix of 97% zinc oxide and 3% potassium hydroxide the latter substance will absorb up to about its own weight of moisture during a storage period of not exceeding 24 hours. In this case, the final mixture will, of course, be 94% zinc oxide, 3% potassium hydroxide, and 3% absorbed moisture.

The advantages of the invention, however, are present both from a product and processing standpoint so long as the potassium hydroxide-zinc oxide mix remains in a dry i. e. free flowing state. Since such mix can contain up to about 25% by weight of moisture and still retain the desired properties, satisfactory results can be obtained from mixes containing from about 70% to about 99% zinc oxide, about 0.5% to about 5% dry potassium hydroxide powder, and about 0.5% to about 25% absorbed moisture.

The mixture is then placed in a mold together with a perforated zinc sheet as a supporting member and a silver wire which will act as a conducting member in the completed plate and a pressure of from about 0.5 ton per square inch to about 3 tons per square inch is applied thereto.

It has been found that the mechanical properties of a negative plate produced in accordance with the invention are so enhanced that, if desired, the zinc sheet can be eliminated except where extreme strength is desired in the plate. In this case, however, due to lack of metallic content of the "unformed" plate the process of formation to metallic zinc is difficult by reason of low conductivity. This can be overcome by the addition of powdered metallic zinc to the potassium-hydroxide oxide mix in an amount of from about 2% to about 20% of the weight of said mix. Although satisfactory plates are produced, if amounts of zinc powder in the upper portion of the range are used, precautions against excessive temperature rise caused by rapid oxidation of the finely divided zinc must be taken. A metallic zinc content of from 4% to 6% is, therefore, preferred.

That the addition of such metallic zinc is beneficial to the electrical characteristics of the negative plate during life as well as being an aid to formation is shown by the following table. Cell I contained plates having a mixture of 94% zinc oxide, 3% potassium hydroxide and 3% moisture, such plates having no supporting sheet but containing a silver wire as a conducting member. Cell II contained plates of identical construction but comprising a mixture of 79% zinc oxide, 15% powdered metallic zinc, 3% potassium hydroxide, and 3% moisture.

*Table A*

|  | A. H. Chg to 2:00 v. chge. voltage | Disch. I. 50 Amps. to 1.05 F. V. | Disch. II 50 Amps. to 1.05 F. V. | Disch. III, 50 Amps. to 1.05 F. V. |
|---|---|---|---|---|
|  |  | A. H. | A. H. | A. H. |
| Cell I | 8.75 | 6.96 | 8.75 | 8.12 |
| Cell II | 11.5 | 8.92 | 9.58 | 9.28 |

It will be noted that due to the addition of metallic zinc to the potassium hydroxide-zinc oxide mix there resulted an increased acceptance of the charging current. Additionally, the plates so produced exhibited enhanced electrical performance not only on the first discharge but also on subsequent discharges which were preceded by recharges of substantially equivalent amounts.

In the following table, cell III contained plates of 94% zinc oxide, 3% potassium hydroxide, and 3% moisture whereas cell IV contained plates comprising 89% zinc oxide, 5% powdered metallic zinc, 3% potassium hydroxide, and 3% moisture. Plates of both cells were of identical physical construction. Since these cells were of a different design than those set forth in Table A, no direct comparison between the tables can be made.

Table B

|  | A. H. Chg. to 2:00 v. chg. voltage | Voltage @ end of 6 min. disch. @ 135 amps. | Voltage @ end of 2nd 6 min. disch. @ 135 amps. | Voltage @ end of 3rd 6 min. disch. @ 135 amps. |
|---|---|---|---|---|
| Cell III | 27 | 1.31 | 1.325 | 1.24 |
| Cell IV | 32 | 1.35 | 1.36 | 1.33 |

It will be noted that these cells were discharged for a fixed period of time to a final voltage in contrast to the Table A discharges which were carried out to a fixed final voltage. Here again, however, the advantage of the cell having plates containing powdered metallic zinc is apparent.

Although the theories underlying the invention are not completely understood it is felt that some type of hydrated potassium zincate may be formed throughout the plate by virtue of the addition of moisture which zincate imparts mechanical stability to the plaque. Alternatively, it may be theorized that as a result of the absorption of moisture and carbon dioxide from the atmosphere, a zinc-potassium carbonate complex imparting a cementing action to the zinc oxide particles may be formed. In any event, and whatever may be the chemical reaction which occurs the plaque is much more rugged, has a greater factor of handleability, and experience less shedding during electrical formation of the final plate, than those which have heretofore been produced.

Alternate methods of practicing the invention are available, the same results being thereby produced. For example, it may be desirable to store the potassium hydroxide powder in such a manner that it will absorb the desired moisture content prior to mixing the powder with zinc oxide. In the alternative and to eliminate storage time, water in the desired amount may be added to the dry mix.

As set forth above it will be seen that we have devised a method of producing a negative plate for silver-zinc batteries and a new and improved plate itself which retain all the advantages of the processes and practice of the prior art while completely avoiding the disadvantages thereof. Other forms and variations of our invention coming within the scope of the appended claims will readily occur to others skilled in the art.

We claim:

1. A method of producing negative plates for silver-zinc batteries which comprises the steps of mixing about 95% to about 99.5% zinc oxide with about 0.5% to about 5% of a powdered metallic hydroxide selected from the group consisting of lithium hydroxide, potassium hydroxide, and sodium hydroxide, adding moisture in an amount not substantially exceeding the weight of the selected hydroxide, and pressing the resultant dry mixture onto a conducting member.

2. The method of claim 1 in which there is added from about 2% to about 20% of powdered metallic zinc to the dry mixture of potassium hydroxide-zinc oxide and moisture.

3. A negative plate for silver-zinc batteries comprising a dry mixture of zinc oxide and from about 0.5% to about 5% by weight of a powdered metallic hydroxide selected from the group consisting of potassium hydroxide, lithium hydroxide, and sodium hydroxide, said dry mixture containing absorbed moisture in an amount not substantially exceeding the weight of the selected hydroxide.

4. The negative plate of claim 3 which contains from about 2% to about 20% of powdered metallic zinc to the dry mixture of potassium hydroxide-zinc oxide and moisture.

References Cited in the file of this patent

UNITED STATES PATENTS

| 307,945 | Hogg | Nov. 11, 1884 |
| 543,372 | Boettcher | July 23, 1895 |
| 2,594,710 | Andre | Apr. 29, 1952 |
| 2,669,594 | Andre | Feb. 16, 1954 |
| 2,724,734 | Howard | Nov. 22, 1955 |

FOREIGN PATENTS

| 486,023 | Canada | Aug. 26, 1952 |